US012583067B2

(12) United States Patent
Hong et al.

(10) Patent No.: US 12,583,067 B2
(45) Date of Patent: Mar. 24, 2026

(54) BOLT FASTENING DRIVE DEVICE AND CONTROL METHOD THEREOF

(71) Applicant: SK On Co., Ltd., Seoul (KR)

(72) Inventors: Min Jeong Hong, Daejeon (KR); Yoong Hee Lee, Daejeon (KR); Jae Hun Kim, Daejeon (KR); Yoon Sung Oh, Daejeon (KR); Seul Gi Lee, Daejeon (KR); Seung Won Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 19/216,594

(22) Filed: May 22, 2025

(65) Prior Publication Data

US 2026/0014655 A1 Jan. 15, 2026

(30) Foreign Application Priority Data

Jul. 11, 2024 (KR) ......................... 10-2024-0092007

(51) Int. Cl.
B23P 19/12 (2006.01)
B23P 19/06 (2006.01)
B25B 21/00 (2006.01)

(52) U.S. Cl.
CPC .............. B23P 19/12 (2013.01); B23P 19/06 (2013.01); B25B 21/00 (2013.01); *Y10T 29/49963* (2015.01); *Y10T 29/53061* (2015.01)

(58) Field of Classification Search
CPC .......... B23P 19/06; B23P 19/12; B25B 21/00; Y10T 29/49963; Y10T 29/53061
See application file for complete search history.

(56) References Cited

U.S. PATENT DOCUMENTS

| | | | | |
|---|---|---|---|---|
| 2,728,365 A | * | 12/1955 | Austin | B25B 23/00 81/438 |
| 4,043,365 A | * | 8/1977 | York | B23P 19/06 192/93 C |
| 4,462,283 A | * | 7/1984 | Ito | B25B 23/08 81/57.37 |
| 5,211,061 A | * | 5/1993 | Goodwin | B23P 19/066 702/41 |
| 5,365,810 A | * | 11/1994 | Inaniwa | B23P 19/001 81/57.37 |
| 6,408,531 B1 | * | 6/2002 | Schimmels | B25J 17/0208 33/644 |

(Continued)

FOREIGN PATENT DOCUMENTS

| | | | | |
|---|---|---|---|---|
| DE | 2640256 A | * | 3/1977 | |
| KR | 10-0162023 B1 | | 12/1998 | |

(Continued)

*Primary Examiner* — Jermie E Cozart
(74) *Attorney, Agent, or Firm* — IP & T GROUP LLP

(57) ABSTRACT

A bolt fastening drive device is disclosed. The bolt fastening drive device includes a rotary shaft coupled to a drive controller and rotated, a bit part in which a first end is coupled to the rotary shaft and a second end is coupled to a bolt so that the bolt is fastened to a fastening hole of a fastening member, a first bracket coupled to the rotary shaft, a sensor part coupled to an inner portion of the first bracket, and a second bracket in which a first portion is brought in contact with a bolt head of the bolt and a second portion is coupled to the sensor part.

10 Claims, 8 Drawing Sheets

(56)     References Cited

U.S. PATENT DOCUMENTS

| | | | | |
|---|---|---|---|---|
| 2005/0050720 | A1* | 3/2005 | Asano | B23P 19/02 |
| | | | | 29/709 |
| 2007/0180956 | A1* | 8/2007 | Noguchi | B23P 19/10 |
| | | | | 81/467 |
| 2008/0000333 | A1* | 1/2008 | Seno | B23P 19/065 |
| | | | | 81/57.11 |
| 2008/0115628 | A1* | 5/2008 | Shirai | B25B 23/0057 |
| | | | | 81/55 |
| 2013/0340573 | A1* | 12/2013 | Lee | B23P 19/06 |
| | | | | 81/57.37 |
| 2015/0151391 | A1* | 6/2015 | Kuo | B23P 19/06 |
| | | | | 81/430 |
| 2018/0333811 | A1* | 11/2018 | Maeda | B23P 19/06 |
| 2020/0298357 | A1* | 9/2020 | Farrell | B25B 23/08 |
| 2022/0258292 | A1* | 8/2022 | Kornelsen | B25J 11/00 |

FOREIGN PATENT DOCUMENTS

| | | | | |
|---|---|---|---|---|
| KR | 10-1585193 | B1 | 1/2016 | |
| KR | 10-2131017 | B1 | 7/2020 | |
| WO | WO-2015140938 | A1 * | 9/2015 | ........... B23P 19/006 |
| WO | WO-2016103298 | A1 * | 6/2016 | ............. B25J 13/08 |

* cited by examiner

BOLT FASTENING DRIVE DEVICE AND CONTROL METHOD THEREOF

CROSS REFERENCE TO RELATED APPLICATION

The present application claims priority to Korean Patent Application No. 10-2024-0092007, filed Jul. 11, 2024, the entire contents of which are incorporated herein for all purposes by this reference.

BACKGROUND OF THE INVENTION

Field of the Invention

The present disclosure relates to a bolt fastening drive device and a control method thereof.

Description of the Related Art

The fastening of materials using bolts and related fasteners has been used in a variety of technical fields. A bolt is used to fasten or join materials together, and for this purpose, a fastening hole for fastening the bolt is usually formed in the material.

In the field of secondary batteries, the process of assembling modules or battery packs is one of the important processes for preventing the vibration and shock of the module or pack itself. Materials used to assemble modules or packs of secondary batteries are often low-stiffness materials such as aluminum or plastic, so it is necessary to minimize physical deformation of these materials. In addition, when a center point of the fastening bolt and a center point of a fastening hole do not match due to accumulated tolerance in the case of stacking and joining multiple materials, twisting of the flexible material can occur and cause many problems in the production process.

DOCUMENT OF RELATED ART

Patent Document (Patent Document 1) KR 0162023 B1

SUMMARY OF THE INVENTION

An objective of the present disclosure is to provide a bolt fastening drive device, wherein when a bolt is fastened to at least one fastening member, the bolt fastening drive device is capable of efficiently realizing automation in bolt fastening and enhancing productivity by efficiently sensing whether or not bolt fastening is aligned to a fastening hole and correcting a driving direction.

Another objective of the present disclosure is to provide a control method of a bolt fastening drive device, wherein when a bolt is fastened to at least one fastening member, the bolt fastening drive device is capable of securing the reliability of bolt fastening by sensing a moment of force according to whether or not bolt fastening is aligned to a fastening hole and correcting a driving direction, and of efficiently improving the reliability in operation of the bolt fastening drive device by separately storing and learning the accuracy according to the number of corrections of a bolt fastening driving direction and data about failed correction.

According to the embodiment of the present disclosure, there is provided a bolt fastening drive device includes: a rotary shaft coupled to a drive controller and rotated; a bit part in which a first end is coupled to the rotary shaft and a second end is coupled to a bolt so that the bolt is fastened to a fastening hole of a fastening member; a first bracket coupled to the rotary shaft; a sensor part coupled to an inner portion of the first bracket; and a second bracket in which a first portion is brought in contact with a bolt head of the bolt and a second portion is coupled to the sensor part.

At this point, the sensor part may be configured to receive a moment of force applied to the bolt, through the second bracket to sense a force in a bolt fastening direction.

Furthermore, one portion of the second bracket may include a contact protrusion, and the contract protrusion may be brought into contact with one surface of the bolt head.

Furthermore, the second bracket may include a magnet that is coupled to the bolt head, and the magnet may be brought into contact with the bolt head by attraction.

Furthermore, the bolt fastening drive device may include: a bush securely coupled to the second bracket; a magnet in which a first surface is movably coupled to the bush and a second surface is coupled to one surface of the bolt head.

Furthermore, the drive controller may be configured to control a driving force of the rotary shaft and a driving direction of bolt fastening of the rotary shaft.

According to another embodiment of the present disclosure, the bolt fastening drive device may include: a rotary shaft coupled to a drive controller and rotated; a bit part in which a first end may be coupled to the rotary shaft and a second end may be coupled to a bolt so that the bolt may be fastened to a fastening hole of a fastening member; a bracket coupled to the rotary shaft; a sensor part coupled to an inner portion of the bracket; and a bearing part, wherein the bit part may be coupled to an inner circumferential surface of the bearing part to allow the bit part to be rotatable, and the sensor part may be coupled to an outer circumferential surface of the bearing part.

At this point, the sensor part may be configured to receive a moment of force, which is applied to the bit part, through the bearing part to sense a force in a bolt fastening direction.

Furthermore, the bearing part may be coupled to the sensor part such that one portion thereof is inserted into the sensor part.

Furthermore, the drive controller may be configured to control a driving force of the rotary shaft and a driving direction of bolt fastening with the sensor part sensing a moment of force that is applied to the bolt through the bearing part coupled to the bit part.

According to the embodiment of the present disclosure, a control method of the bolt fastening drive device may include: transmitting a bolt fastening command; determining whether or not a detected moment value sensed when a bolt is fastened to a fastening hole of a fastening member is equal to or higher than a preset threshold value; driving bolt fastening according to the transmitting of a bolt fastening command when the detected moment value is less than the preset threshold value; and correcting a bolt fastening driving direction when the detected moment value is equal to or higher than the preset threshold value.

At this point, after the correcting of the bolt fastening driving direction when the detected moment value is equal to or higher than the preset threshold value, the control method may include: fastening the bolt in a corrected bolt fastening driving direction when the corrected detected moment value detected by the corrected bolt fastening driving direction is less than the preset threshold value, and counting the number of corrections in the correcting of the driving direction when the corrected detected moment value detected by the corrected bolt fastening driving direction is equal to or greater than the preset threshold value; and correcting a driving direction according to the corrected detected moment value when the number of corrections in the correcting of the driving direction is less than a preset number.

Furthermore, when the number of corrections of the bolt fastening driving direction is equal to or greater than the preset number, the control method may include: storing and learning a corrected data suitable for the fastening hole by comparing a driving direction corrected by the corrected detected moment value and a location of the fastening hole of the fastening member through a vision sensor, and reflecting the stored and learned corrected data for the correcting of the driving direction that is performed by correcting the bolt fastening driving direction.

Furthermore, in the determining of whether or not the detected moment value sensed when the bolt is coupled to the fastening hole of the fastening member is equal to or greater than the preset threshold value, the control method may include: terminating a corresponding bolt fastening process, which is performed when the detected moment value is greater than a preset limited threshold value of the preset threshold value and it is determined that the fastening hole interferes with the upper fastening member.

The features and advantages of the present disclosure will be more apparent from the following detailed description based on the accompanying drawings.

Further, it should be noted that the terms and words used in the specification and the claims should not be construed as being limited to ordinary meanings or dictionary definitions, and should be interpreted as having a meaning and a concept that are consistent with the technical idea of the present disclosure based on the principle that an inventor may appropriately define the concept of a term to best describe the present disclosure of the inventor.

According to the embodiment of the present disclosure, when a bolt is fastened to at least one fastening member, the reliability of the bolt fastening to the fastening member can be improved by sensing a moment of force occurring when the bolt is fastened to the fastening hole of the fastening member and correcting a bolt driving direction.

Furthermore, when the bolt is fastened to fastening holes of multiple fastening members, in the case of misalignment of fastening holes due to misalignment of stacking of the multiple fastening members, the reliability of bolt fastening drive correction can be ensured by efficiently sensing a fastening hole blocked by an upper fastening member.

Furthermore, a driving direction is additionally corrected according to the number of corrections of the driving direction of the bolt fastening drive device, or comparison data between a current corrected driving direction and a real location of the fastening hole is stored and learned separately to enhance the reliability of the correction of the driving direction of the bolt fastening drive device, and the bolt fastening drive device can be controlled to be optimized for field conditions.

4

Figure 3:
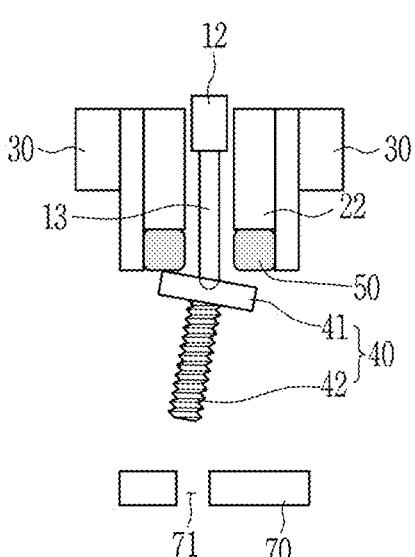

FIG. 3 is a partially sectional schematic view showing the bolt fastening drive device according to a modification example of the embodiment of the present disclosure.

Figure 4:
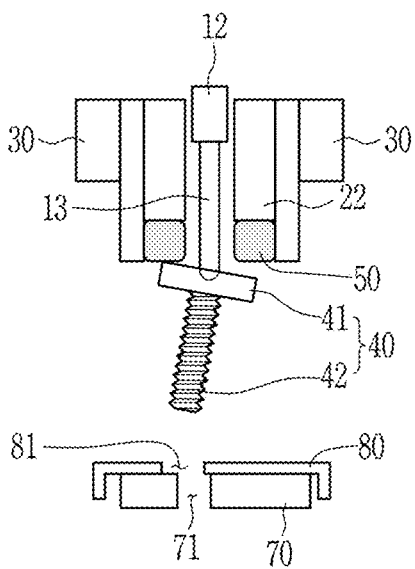

FIG. 4 is a partially sectional schematic view according to another application example of the bolt fastening drive device according to the modification example of the embodiment of the present disclosure.

Figure 5:
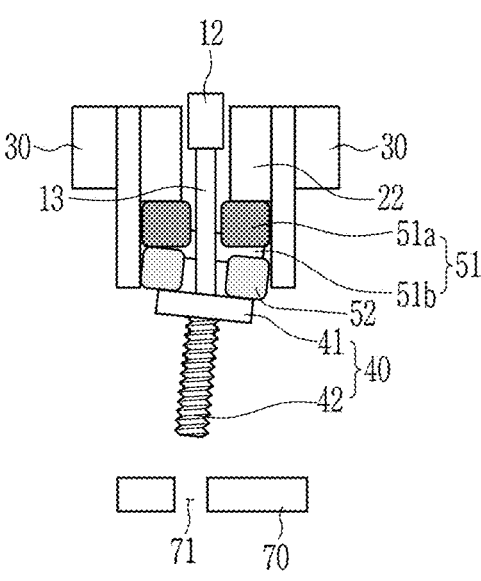

FIG. 5 is a partially section schematic view showing the bolt fastening drive device according to another modification example of the embodiment of the present disclosure.

Figure 6:
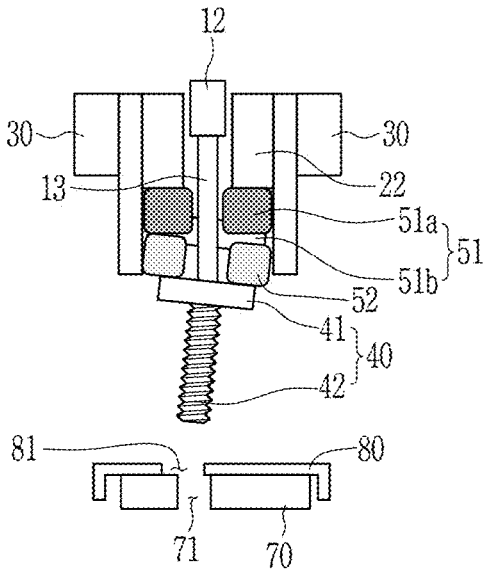

FIG. 6 is a partially sectional schematic view according to another application example of the bolt fastening drive device according to the modification example of the embodiment of the present disclosure.

Figure 7:
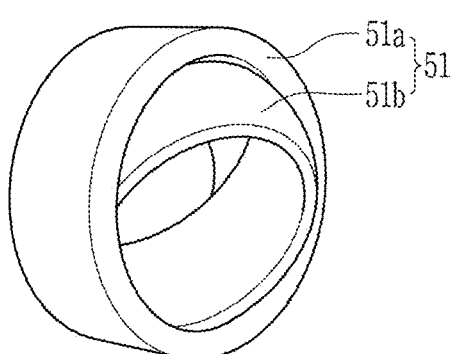

FIG. 7 is a perspective view showing a bush according to the modification example of the embodiment of the present disclosure.

Figure 8:
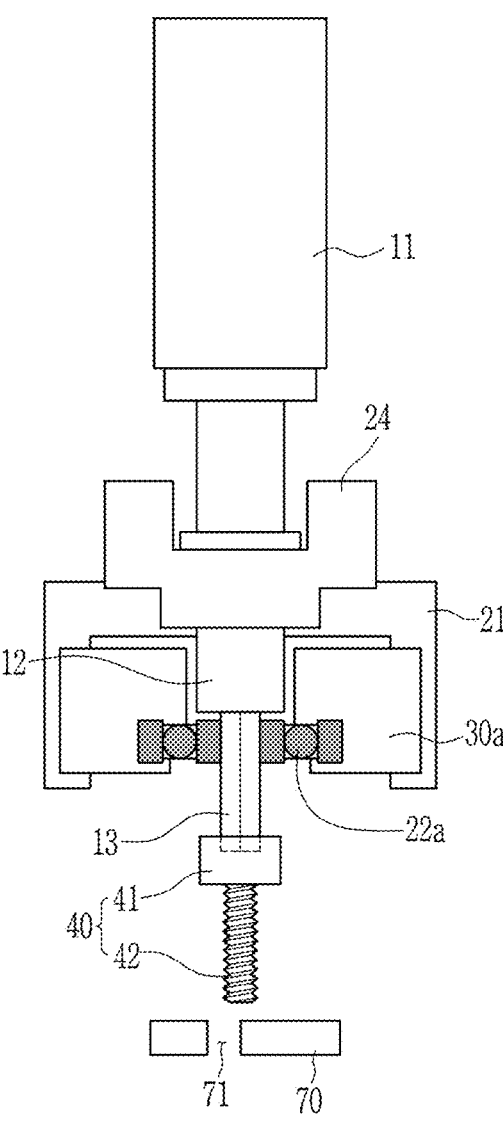

FIG. 8 is a sectional schematic view showing the bolt fastening drive device according to another embodiment of the present disclosure.

Figure 9:
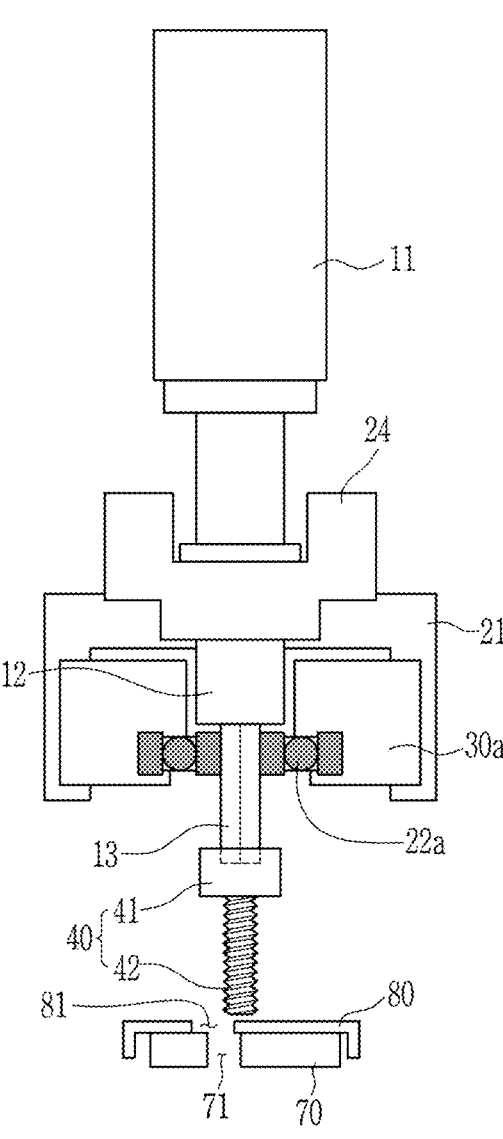

FIG. 9 is a sectional schematic view according to another application example of the bolt fastening drive device according to the embodiment of the present disclosure.

Figure 10:
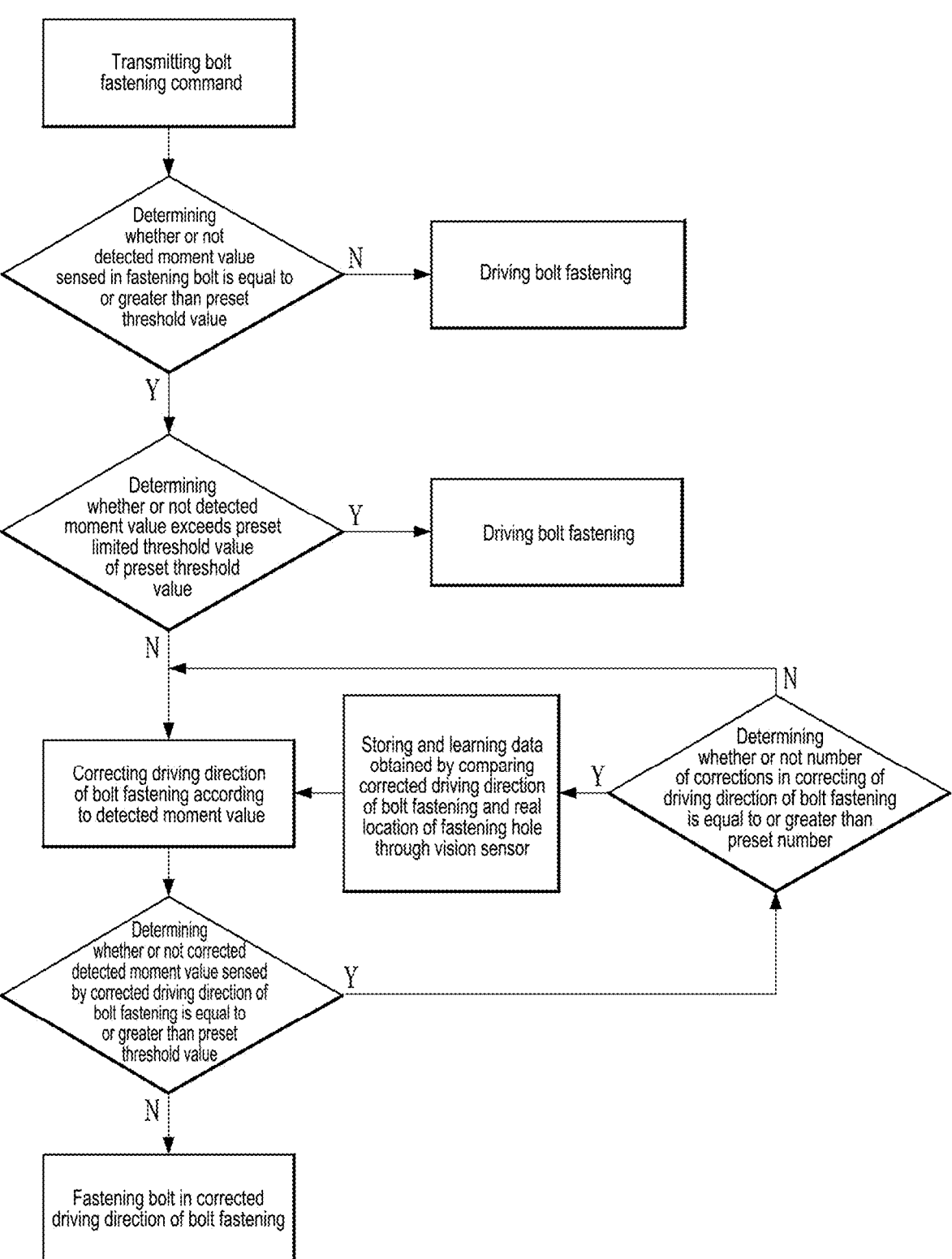

FIG. 10 is a flowchart of a control method of the bolt fastening drive device according to an embodiment of the present disclosure.

DETAILED DESCRIPTION OF THE DISCLOSURE

The terminology used to describe embodiments of the present disclosure is not intended to limit the present disclosure. It should be noted that expressions in singular may include expressions in plural unless the context clearly indicates otherwise.

In assigning reference numerals to components of the drawings, it should be noted that the same components are given the same reference numerals as much as possible even when they are shown in different drawings, and similar reference numerals are given to similar components.

The drawings may be schematic or exaggerated to illustrate embodiments. In the present document, expressions such as "has", "may have", "comprises", "may comprise", "includes", or "may include" indicate the presence of corresponding characteristics (e.g., a numerical value, function, operation, or component such as a part), and does not exclude the presence of additional characteristics.

Terms such as "one", "other", "another", "first", "second", etc. are used to distinguish one component from another, and components are not limited by the above terms.

Hereinbelow, with reference to accompanying drawings, the present disclosure will be described.

Figure 1:
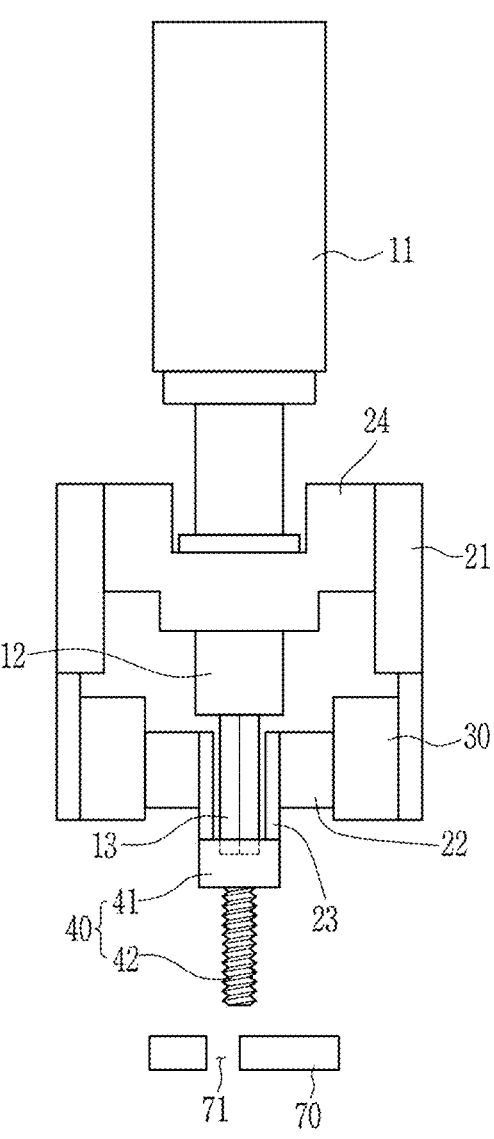
FIG. 1 is a sectional schematic view showing a bolt fastening drive device according to an embodiment of the present disclosure.
Figure 2:
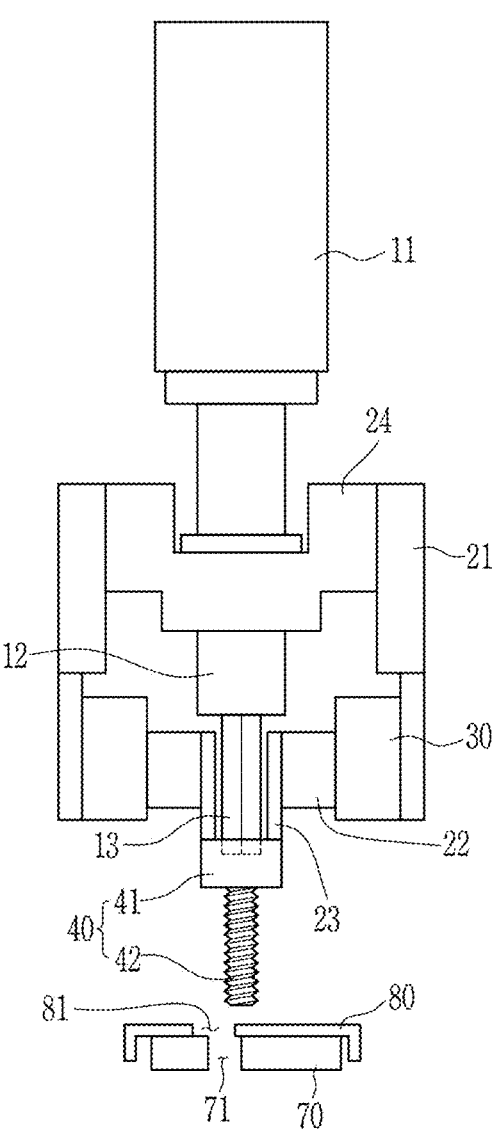
FIG. 2 is a sectional schematic view according to another application example of the bolt fastening drive device according to the embodiment of the present disclosure.

FIG. 1 is a sectional schematic view showing a bolt fastening drive device according to an embodiment of the present disclosure. FIG. 2 is a sectional schematic view according to another application example of the bolt fastening drive device according to the embodiment of the present disclosure. FIG. 3 is a partially sectional schematic view showing the bolt fastening drive device according to a modification example of the embodiment of the present disclosure. FIG. 4 is a partially sectional schematic view according to another application example of the bolt fastening drive device according to the modification example of the embodiment of the present disclosure. FIG. 5 is a partially section schematic view showing the bolt fastening drive device according to another modification example of the embodiment of the present disclosure. FIG. 6 is a partially sectional schematic view according to another application example of the bolt fastening drive device according to the modification example of the embodiment of the present disclosure. FIG. 7 is a perspective view showing a bush according to the modification example of the embodiment of the present disclosure.

According to the embodiment of the present disclosure, the bolt fastening drive device may include a rotary shaft 12 coupled to a drive controller 11 and rotatably operated, a bit part 13 in which a first end is coupled to the rotary shaft 12 and a second end is coupled to a bolt 40 so that the bolt 40 is fastened in a fastening hole 71 of a fastening member 70, a first bracket 21 coupled to the rotary shaft 12, a sensor part 30 coupled to an inner portion of the first bracket 21, and a second bracket 22 in which a first portion is brought in contact with a bolt head 41 of the bolt 40 and a second portion is coupled to the sensor part 30.

As shown in FIGS. 1 and 2, the rotary shaft 12 may be coupled to the drive controller 11 and rotatably operated. FIG. 1 shows the bolt fastening drive device with the bolt 40 to be fastened in the fastening hole 71 of the single fastening member 70. FIG. 2 shows the bolt fastening drive device with the bolt 40 to be fastened to a plurality of fastening members 70, and the fastening state including an upper fastening hole 81 of an upper fastening member 80.

The drive controller 11 is coupled to the rotary shaft 12 and may adjust and control operation of the rotary shaft 12. The drive controller 11 adjusts an operational force of the rotary shaft 12 and a driving direction of bolt fastening of the rotary shaft 12, thereby adjusting a fastening force of the bolt fastening or appropriately correcting a driving direction of the bolt fastening.

The first end of the bit part 13 is coupled to the rotary shaft 12, and the second end thereof is coupled to the bolt 40, thereby transmitting a rotational force of the rotary shaft 12 to the bolt 40 and fastening the bolt 40 in the fastening hole 71 of the fastening member 70.

The first bracket 21 may be coupled to the rotary shaft 12 to support the sensor part 30. At this point, the first bracket 21 may be coupled to a shaft coupling part 24 to which the rotary shaft 12 is rotatably coupled, or the first bracket 21 integrated with the shaft coupling part 24 may be coupled to the rotary shaft 12.

The sensor part 30 of a ring shape is coupled to an inner portion of the first bracket 21, and may sense a moment of force in 360 degrees when the bolt 40 is fastened. The sensor part 30 is not limited to a specific type of sensor, and according to the embodiment of the present disclosure, when the bolt 40 is fastened, it is sufficient for the sensor part 30 to sense moments of force in different directions applied to the bolt 40, and obviously, various known sensors may be used. The sensor part 30 may be formed into a ring shape extending in a circumferential direction of the rotary shaft, and also, multiple separate sensor parts 30 disconnected and spaced from each other are coupled to each other to provide one sensor part 30. A coupling position and a shape of the sensor part 30 are not limited to a specific structure, but of course, it must have a structural coupling for receiving a moment of force applied to the bolt 40 when the bolt is fastened.

The first portion of the second bracket 22 is brought into contact with the bolt head 41 of the bolt 40 in a circumferential direction, and the second portion is coupled to the sensor part 30. Therefore, a moment of force applied to the bolt 40 when the bolt is fastened is transmitted to the sensor part 30 that is coupled with the second portion, via the bolt head 41 so that a moment of force can be measured. In other words, the sensor part 30 may receive a moment of force applied to the bolt 40 through the second bracket 22 and sense a moment of force in a fastening direction of the bolt 40.

The second bracket 22 is brought into direct contact with the bolt head 41, and a contact protrusion 23 that is brought into contact with one surface of the bolt head 41 may be separately formed in order to precisely sense a moment of force of the bolt head 41. Otherwise, a form integrated with the second bracket 22 is brought into direct contact with the bolt head 41 and transmits a moment of force applied to the bolt 40 to the sensor part 30, thereby sensing a moment of force when the bolt 40 is fastened.

As shown in FIGS. 3 and 4, the second bracket 22 may include a magnet 50 on one end that is coupled in contact with the bolt head 41 by attraction. The magnet 50 may be coupled to a common metal bolt head 41 by mutual attraction. FIG. 3 shows the bolt fastening drive device with the bolt 40 fastened to the fastening hole 71 of the one fastening member 70. FIG. 4 shows the bolt fastening drive device that is fastened to a plurality of fastening members 70, and the fastening state including the upper fastening hole 81 of the upper fastening member 80.

As shown in FIGS. 3 and 4, when the bolt 40 interferes with the fastening hole 71 of the fastening member 70 or the upper fastening member 80 interferes with the fastening hole 71 during fastening of the bolt and the bolt 40 is not precisely fastened, the bolt head 41 is separated from attraction with respect to the magnet 50 due to twisting of the bolt 40 in the fastening direction.

As described above, when the bolt head 41 and the magnet 50 of the second bracket 22 are separated from each other, based on a distance, location, or direction in which the magnet 50 is separated and moved away from the bolt head 41, the sensor part 30 may sense a moment of force applied to the bolt 40 during fastening of the bolt.

As shown in FIGS. 5 and 6, the magnet 50 may include a bush 51 securely coupled to the second bracket 22, and a magnet 52 in which a first surface movably coupled to the bush 51 and a second surface is coupled to one surface of the bolt head 41. In other words, as the magnet 52 coupled to the bolt head 41 by attraction is moved in a twisting direction of the bolt 40 in the fastening of the bolt 40, a moment of force applied to the bolt 40 may be sensed.

FIG. 5 shows the bolt fastening drive device with the bolt 40 fastened to the fastening hole 71 of the one fastening member 70. FIG. 6 shows the bolt fastening drive device that is fastened to a plurality of fastening members 70, and the fastening state including the upper fastening hole 81 of the upper fastening member 80.

At this point, the bush 51 may include, as shown in FIG. 7, a fixation part 51a securely coupled to the second bracket 22, and a flow part 51b coupled to an inner portion of the fixation part 51a to be movable by a predetermined distance.

As the magnet 52 is coupled to the flow part 51b, the magnet is moved while being coupled to the bolt head 41 by attraction according to the movement of bolt 40, thereby sensing a moment of force applied to the bolt 40 by the sensor part 30.

FIG. 8 is a sectional schematic view showing the bolt fastening drive device according to another embodiment of the present disclosure. FIG. 9 is a sectional schematic view according to another application example of the bolt fastening drive device according to the embodiment of the present disclosure.

According to the embodiment of the present disclosure, the bolt fastening drive device may include the rotary shaft 12 coupled to the drive controller 11 and rotatably operated, the bit part 13 in which a first end is coupled to the rotary shaft 12 and a second end is coupled to the bolt 40 so that the bolt 40 is fastened in the fastening hole 71 of the fastening member 70, a bracket 21 coupled to the rotary shaft 12, the sensor part 30a coupled to an inner portion of the bracket 21, and a bearing part 22a coupled to an outer circumferential surface of the bit part 13 to allow the bit part 13 to be rotatable, and coupled to the sensor part 30a.

According to the embodiment of the present disclosure, unlike the previous embodiment of the present disclosure, the bolt fastening drive device may be configured to transmit a moment of force applied to the bolt 40 during fastening of the bolt to the sensor part 30a through the bearing part 22a that is coupled to the bit part 13 coupled to the bolt 40 to fasten the bolt 40.

As shown in FIGS. 8 and 9, the rotary shaft 12 may be coupled to the drive controller 11 and operated rotatably. FIG. 8 shows the bolt fastening drive device with the bolt 40 fastened to the fastening hole 71 of the fastening member 70. FIG. 9 shows the bolt fastening drive device that is fastened to a plurality of fastening members 70, and the fastening state including the upper fastening hole 81 of the upper fastening member 80.

The drive controller 11 is coupled to the rotary shaft 12 and may adjust and control operation of the rotary shaft 12. The drive controller 11 adjusts a driving force of the rotary shaft 12 and a driving direction of bolt fastening of the rotary shaft 12, thereby adjusting a fastening force of fastening of the bolt 40 or appropriately correcting a driving direction of fastening of the bolt 40.

The first end of the bit part 13 is coupled to the rotary shaft 12, and the second end thereof is coupled to the bolt 40, thereby transmitting a rotational force of the rotary shaft 12 to the bolt 40 and fastening the bolt 40 to the fastening hole 71 of the fastening member 70.

According to the embodiment of the present disclosure, the bolt fastening drive device may be configured to transmit a moment of force applied to the bolt 40 to the sensor part 30a through the bearing part 22a coupled to the bit part 13 when a fastening direction of the bolt 40 is misaligned when the bit part 13 fastens the bolt 40.

The sensor part 30a may be coupled to an inner portion of the bracket 21. The sensor part 30a senses a moment of force applied to the bolt 40 when the bit part 13 fastens the bolt 40, via the bearing part 22a coupled to the bit part 13. According to the embodiment of the present disclosure, through the bit part 13 coupled with the fastening of the bolt 40, the sensor part may sense a moment of force to be applied when a driving direction is not aligned during fastening of the bolt 40.

Specifically, the bearing part 22a is coupled to an outer circumferential surface of the bit part 13 so that the bit part 13 is rotatable at an inner circumferential surface, and the sensor part 30a is coupled to the outer circumferential surface of the bearing part 22a, thereby directly transmitting a moment of force that is transmitted to the bit part 13 from the bolt 40, to the sensor part 30a via the bearing part 22a.

When the bolt 40 is not fastened to a regular location and twisted in a misaligned direction with the fastening of the bolt, a moment of force applied to the bolt 40 is directly transmitted to the bit part 13, and the sensor part 30a receives the moment of force from the bearing part 22a coupled to the bit part 13 and senses the moment of force applied to the bolt 40 in the fastening direction of the bolt 40.

Since the bearing part 22a may be coupled to the sensor part 30a such that one portion thereof is inserted into the sensor part 30a, the sensor part can efficiently sense a moment of force of the bit part 13 coupled to the inner portion of the bearing part 22a.

When the sensor part 30a senses a moment of force applied to the bolt 40 via the bearing part 22a coupled to the bit part 13 during fastening of the bolt, the drive controller 11 may appropriately correct and control a driving force of the rotary shaft 12 and a driving direction of the fastening of the bolt.

FIG. 10 is a flowchart of a control method of the bolt fastening drive device according to an embodiment of the present disclosure.

According to the embodiment of the present disclosure, the control method of the bolt fastening drive device includes transmitting a bolt fastening command, determining whether or not a detected moment value sensed when the bolt is coupled to the fastening hole of the fastening member is equal to or greater than a preset threshold value, driving fastening of bolt according to the transmitting of the command when the detected moment value is less than a preset value, and correcting the driving directions of the bolt fastening when the detected moment value is equal to or greater than the preset value.

First, the transmitting of a bolt fastening command is performed. The bolt fastening drive device is operated to an initial preset location to fasten the bolt.

Next, it is determined whether or not a detected moment value sensed when the bolt is coupled to the fastening hole of the fastening member is equal to or greater than the preset threshold value.

When the bolt is fastened in a direction of the fastening hole of the fastening member, it is determined whether or not the bolt is still fastened to the fastening hole of the fastening member without any resistance or a larger moment of force than a normal moment is applied to the bolt due to misalignment of the fastening hole of the fastening member.

The preset threshold value is a value greater than the maximum value when the bolt is directly fastened to the fastening hole of the fastening member, and when the preset threshold value is sensed as a detected moment value less than the threshold value, it may be determined that the bolt is normally inserted and fastened into the fastening hole of the fastening member.

Next, when the detected moment value applied to the bolt is less than the preset threshold value, the bolt fastening is directly driven by the transmitting of the command, and the bolt may be fastened to the fastening hole of the fastening member. However, when the detected moment value is equal to or greater than the preset threshold value, the process may be controlled to correct the driving direction of the bolt fastening. In other words, when the detected moment value applied to the bolt is equal to or higher than the preset threshold value, it is determined that the bolt is not coupled to match with the fastening hole of the fastening member and is misaligned or twisted so that the bolt receives a moment of force equal to or greater than a normal value. Therefore, in this case, the driving direction of the bolt fastening can be appropriately corrected according to the detected moment value of the bolt.

After the driving direction of the bolt fastening is corrected when the detected moment value applied to the bolt is equal to or greater than the preset threshold value, when the corrected detected moment value applied to the bolt, which is re-detected by the corrected driving direction of bolt fastening, is less than a preset threshold value, the bolt can be fastened in the corrected driving direction of bolt fastening.

Even though the driving direction of the bolt fastening is corrected according to the detected moment value applied to the bolt due to the misaligned fastening direction in the bolt fastening, the corrected detected moment value applied to the bolt may be equal to or greater than the preset threshold value.

At this point, when the corrected detected moment value applied to the bolt that is re-detected in bolt fastening according to the corrected driving direction of the bolt fastening is equal to or greater than the preset threshold value, the number of corrections in the driving direction is counted first.

When the number of corrections in the correcting of the driving direction of the bolt fastening is less than the preset number, the method may include correcting the driving direction of bolt fastening through the corrected detected moment value detected from the bolt by the corrected driving direction.

However, when the number of corrections of the driving direction of the bolt fastening is equal to or greater than the preset number, it may be determined that precise bolt fastening is not driven only with corrections of the driving direction based on the corrected detected moment value applied to the bolt during the bolt fastening. Therefore, in this case, the setting of correction range of the driving direction of the bolt fastening or locations of the fastening member and the fastening hole are outside the preset correction range, and the driving can be terminated.

In this case, the method may include storing and learning corrected data that is corrected to be suitable for the fastening hole by comparing a driving direction obtained by the corrected detected moment value and a rear location of the fastening hole of the fastening member through the vision sensor, and reflecting the stored and learned corrected data in the correcting of the driving direction in bolt fastening.

In other words, when the driving direction is not precise after a certain number of corrections of the driving direction, an error in the corrected driving direction of the bolt fastening and the location of the fastening hole of the rear fastening member are measured to be used as corrected data to correct the driving direction of the bolt fastening in the future and the reliability of the corrections in the bolt fastening driving direction can be ensured in the future.

In the determining of whether or not the detected moment value that is sensed when the bolt is coupled to the fastening hole of the fastening member is equal to or greater than the preset threshold value, when the detected moment value is greater than the preset limited threshold value among the preset threshold value, it is determined as interference of the fastening hole by the upper fastening member, and the bolt fastening driving can be terminated.

In other words, the multiple fastening members are stacked together to fasten the bolt through the fastening holes, the fastening holes of the multiple fastening members may not be aligned.

As shown in FIGS. 2, 4, 6, and 9 that have been described above, when the upper fastening member 80 is stacked on an upper portion of the fastening member 70, and the upper fastening member 80 covers the fastening hole 71 of the fastening member 70, a detected moment value during the bolt fastening may be sharply increased. This case is preset as a limited threshold value of the preset threshold values, so it is determined that the corrections of the bolt fastening driving direction are not sufficient to perform the bolt fastening.

Therefore, in this case, the work environment may need to be adjusted by terminating the bolt fastening drive and removing blockage of the fastening hole 71 of the upper fastening member 80.

Referring to FIG. 10, according to the embodiment of the present disclosure, a control method of the bolt fastening drive device will be described as follows.

First, the transmitting of a bolt fastening command is performed. The operation of the bolt fastening drive device may start by transmitting the bolt fastening command to the bolt fastening drive device.

Next, it is determined whether or not the detected moment value sensed during bolt fastening is equal to or greater than the preset threshold value. In this stage, when the detected moment value applied to the bolt is less than the preset threshold value, the bolt fastening operation can be performed normally.

However, when it is determined that the detected moment value applied to the bolt is equal to or greater than the preset threshold value, the correcting of the driving direction of the bolt fastening can be performed according to the detected moment value.

It is determined whether or not the corrected detected moment value sensed by the corrected driving direction of the bolt fastening is equal to or greater than the preset threshold value. In other words, it is determined whether or not the driving direction of the bolt fastening precisely matches the fastening hole of the fastening member by initial correction.

However, when the corrected detected moment value detected by the corrected driving direction of the bolt fastening is less than the preset threshold value, the bolt fastening operation can be performed in the corrected driving direction of the bolt fastening.

Otherwise, the number of corrections in the correcting of driving direction of the bolt fastening is counted to determine whether or not the number of corrections is equal to or greater than a preset number.

When the number of corrections in the correcting of driving direction of the bolt fastening is less than the preset correcting number, the driving direction of the bolt fastening can be corrected. However, when the number of corrections in the correcting of driving direction of the bolt fastening is greater than the preset corrected number, data obtained by comparing the driving direction of the bolt fastening that is corrected and a real location of the fastening hole of the fastening member through the vision sensor is stored and learned, and the data may be used as a learning data in the correcting of driving direction of the bolt fastening.

The control method of the bolt fastening drive device according to the embodiment of the present disclosure that was described above with reference to FIG. 10 does not limit the configuration and the scope of the method of controlling the above-described bolt fastening drive device according to the embodiment of the present disclosure and may be considered as one embodiment included therein.

Hereinabove, the disclosure has been described in detail through specific embodiments. The embodiments are provided to specifically describe the disclosed technology, but the disclosed technology is not limited thereto. Within the scope and the technical spirit of the present disclosure, it will be apparent that various modifications or changes are possible by those skilled in the art, and all modifications or changes of the disclosed technology fall within the appended claims.

What is claimed is:

1. A bolt fastening drive device comprising:

a rotary shaft coupled to a drive controller and rotated;

a bit part in which a first end is coupled to the rotary shaft and a second end is coupled to a bolt so that the bolt is fastened to a fastening hole of a fastening member;

a first bracket coupled to the rotary shaft;

a sensor part coupled to an inner portion of the first bracket; and a second bracket in which a first portion is brought in contact with a bolt head of the bolt and a second portion is coupled to the sensor part.

2. The bolt fastening drive device of claim 1, wherein the sensor part is configured to receive a moment of force applied to the bolt, through the second bracket to sense a force in a bolt fastening direction.

3. The bolt fastening drive device of claim 1, wherein one portion of the second bracket comprises a contact protrusion, and the contact protrusion is brought into contact with one surface of the bolt head.

4. The bolt fastening drive device of claim 1, wherein the second bracket comprises a magnet that is coupled to the bolt head, and the magnet is brought into contact with the bolt head by attraction.

5. The bolt fastening drive device of claim 1, further comprising:

a bush securely coupled to the second bracket;

a magnet in which a first surface is movably coupled to the bush and a second surface is coupled to one surface of the bolt head.

6. The bolt fastening drive device of claim 1, wherein the drive controller is configured to control a driving force of the rotary shaft and a driving direction of bolt fastening of the rotary shaft.

7. A bolt fastening drive device comprising:

a rotary shaft coupled to a drive controller and rotated;

a bit part in which a first end is coupled to the rotary shaft and a second end is coupled to a bolt so that the bolt is fastened to a fastening hole of a fastening member;

a bracket coupled to the rotary shaft;

a sensor part coupled to an inner portion of the bracket; and a bearing part, wherein the bit part is coupled to an inner circumferential surface of the bearing part to allow the bit part to be rotatable, and the sensor part is coupled to an outer circumferential surface of the bearing part.

8. The bolt fastening drive device of claim 7, wherein the sensor part is configured to receive a moment of force, which is applied to the bit part, through the bearing part to sense a force in a bolt fastening direction.

9. The bolt fastening drive device of claim 7, wherein the bearing part is coupled to the sensor part such that one portion thereof is inserted into the sensor part.

10. The bolt fastening drive device of claim 7, wherein the drive controller is configured to control a driving force of the rotary shaft and a driving direction of bolt fastening while the sensor part senses a moment of force that is applied to the bolt through the bearing part coupled to the bit part.

* * * * *